United States Patent [19]

Graham et al.

[11] Patent Number: 4,902,433
[45] Date of Patent: Feb. 20, 1990

[54] EQUIPMENT AND METHOD FOR FILTRATION USING A FABRIC OF POLYACRYLONITRILE FIBERS

[75] Inventors: David E. Graham, Fleet; Malcolm T. McKechnie, Egham; David G. Thompson, East Twickenham, all of United Kingdom

[73] Assignee: The British Petroleum Company p.l.c., London, United Kingdom

[21] Appl. No.: 93,129

[22] Filed: Sep. 2, 1987

Related U.S. Application Data

[63] Continuation of Ser. No. 436,382, Oct. 25, 1982, abandoned.

[30] Foreign Application Priority Data

Nov. 13, 1981 [GB] United Kingdom ................ 8134218

[51] Int. Cl.$^4$ .............................................. B01D 39/04
[52] U.S. Cl. ....................................... 210/791; 210/799; 210/497.2; 210/505; 210/508
[58] Field of Search ............... 210/503, 505, 510, 508, 210/922, 924, 791, 799, 497.2

[56] References Cited

U.S. PATENT DOCUMENTS

| | | | |
|---|---|---|---|
| 3,158,532 | 11/1964 | Pall et al. | 210/503 |
| 3,344,929 | 10/1967 | Stripp | 210/503 |
| 4,184,953 | 1/1980 | Allison et al. | 210/791 |

FOREIGN PATENT DOCUMENTS

| | | |
|---|---|---|
| 1171761 | 11/1969 | United Kingdom . |
| 1229781 | 4/1971 | United Kingdom . |
| 2038652 | 7/1980 | United Kingdom . |
| 1598456 | 9/1981 | United Kingdom . |

*Primary Examiner*—Richard V. Fisher
*Assistant Examiner*—Wanda L. Millard
*Attorney, Agent, or Firm*—Morgan & Finnegan

[57] ABSTRACT

A backwashable filter element consists essentially of a fabric of polyacrylonitrile fibres wherein the diameter of the fibres is in the range 10 to 50 microns and the density of the element is in the range 0.05 to 0.50 g/cc. The element is suitable for use in filtering sea water, particularly for sea water injected into petroleum reservoirs to assist in the recovery of crude oil.

9 Claims, No Drawings

EQUIPMENT AND METHOD FOR FILTRATION USING A FABRIC OF POLYACRYLONITRILE FIBERS

This is a continuation of co-pending application Ser. No. 436,382, filed Oct. 25, 1982, now abandoned.

EQUIPMENT AND METHOD FOR FILTRATION

The present invention relates to a filter element suitable for filtering sea water prior to injection of the sea water into a petroleum reservoir.

A petroleum reservoir is formed by a suitably shaped porous stratum of rock which is capped with an impervious rock. The nature of the reservoir rock is extremely important as the oil is stored in the small spaces or pores which separate the individual rock grains. Sandstones and limestones are generally porous and in the main these are the most common types of reservoir rocks.

To assist in the recovery of crude oil from the reservoir, it is common practice to inject water under pressure into the reservoir rock by injection wells to drive the oil through the rock into near-by producing wells.

With offshore or coastal oil reservoirs, i.e., reservoirs having an abundant, readily available supply of sea water, it is clearly an advantage to make use of this. However, raw sea water is not suitable for direct injection for numerous reasons. It contains significant quantities of dissolved oxygen, about 10 ppm at 10° C., which are sufficient to induce corrosion and encourage bacterial growth. In addition, of course, sea water contains dissolved salts, chiefly chlorides of sodium and magnesium, but calcium, sulphates, carbonates and bicarbonates are also present. It also contains inorganic detritus, marine organisms and bacteria. Because of this, sea water must be subjected to an exhaustive treatment procedure before injection including sterilisation, deoxygenation and the addition of various inhibitors.

It is necessary to filter the water before injection, but the filtration step gives rise to particular problems.

Because of prior treatment the sea water and its contents are generally subjected to severe shearing, e.g., by pumps, and the action of heat supplied to assist deoxygenation, before filtration. This can give rise to a proteinaceous and lipidic pulpy dispersion, resulting from the marine organisms together with fine particles of inorganic material such as sand. This material is intractable, difficult to remove by filtration and quickly clogs conventional filter cloths. It is a gelatinous material of indeterminate composition of both organic and inorganic origin which adheres to conventional filters and is difficult to remove by conventional back washing techniques.

Sand filters or diatomaceous earth have been suggested for the removal of this material from sea water because of their filtering efficiency and ease of regeneration, but these are bulky and heavy and are undesirable for use on offshore platforms where space and weight are at a premium.

Our British Patent Specification 1,598,456 discloses a method for the filtration of sea water employing a polyester filter element which is smaller and lighter than the sand or diatomaceous earth filters previously proposed, but which can, nevertheless, deal with the large quantities of water required for water injection.

We have now discovered an improved filter element which has a longer working life than the filter elements described in 1,598,456. This feature is of considerable importance in the context of offshore operations since it reduces labour requirements and storage space demands.

According to the present invention there is provided a backwashable filter element, suitable for the filtration of sea water, the filter element consisting essentially of a fabric of polyacrylonitrile fibres wherein the diameter of the fibres is in the range 10–50 microns, preferably 20–35 microns and the density of the element is in the range 0.05 to 0.50 g/cc, preferably 0.10 to 0.25 g/cc.

The diameter of the fibres in the filter is an important variable because it is believed that the particles to be filtered are retained on the fibres by electrostatic and van der Waals forces of attraction. In sea water, the latter are likely to be dominant and increasing the fibre diameter will give an increase in van der Waals attraction, thereby expanding the region around the fibre where the probability of capture is high.

On the other hand, reducing the fibre diameter will reduce the van der Waals forces of attraction thereby contracting the region around the fibre where the probability of capture is high.

The fibre diameter is not likely to have a significant effect on the electrostatic forces.

The mechanism of particle release during backwashing is also dominated by van der Waals forces of attraction which, by contrast, should be minimised in this case.

Consequently there is a complex compromise between the need for high van der Waals attractive forces for capturing particles and low van der Waals forces for release. Selecting the fibre diameter is a mode of controlling this attractive force.

The thickness of the element is suitably in the range 2 to 20 mm, preferably 5 to 15 mm. The thickness is defined as the uncompressed thickness before use.

The filter element may be in the form of an annulus, in which case the thickness mentioned above is measured in a radial direction.

The filter element can be a woven or non woven fabric which is sometimes referred to as a felt by those skilled in the art. The element can be made by the well known needle punch process, e.g., as described in British Patent Specification 1,229,781. If desired, the element can be reinforced by a scrim.

Convenient polyacrylonitriles are those obtainable under the Registered Trade Marks Orlon and Acrylan. Orlon 80 and Orlon 40 are suitable grades.

A filter element according to the invention is suitable for the treatment of sea water containing up to 2 mg/liter of particles of size in the range 1 to 80 microns. It will generally remove at least 50% of particles in the 1–2 microns range and at least 60% of particles above 2 microns in size.

According to another aspect of the present invention there is provided a method for the treatment of sea water containing solid impurities which method comprises filtering the sea water through a filter element consisting essentially of a fabric of polyacrylonitrile fibres as hereinbefore described and removing at least some of the solid impurities from the water. In this context, "solid" includes "gelatinous" within its scope.

Conveniently the flow of water through the filter element may be in the range 60 to 120 $m^3/m^2/hr$.

The element can be cleaned by backwashing periodically. In the case of an element in the form of an annulus the cleaning can be effected by reversing the flow through a sector of the element whilst maintaining the filtration in the opposite direction through another sector which can be the remainder of the element.

According to a further feature of the invention there is provided a method for the recovery of oil from a coastal or offshore reservoir which method comprises the steps of filtering sea water through a filter element as hereinbefore described, injecting the filtered sea water into the reservoir through an injection well and recovering crude oil from the reservoir through a production well.

The filter element of the present invention can also be employed to remove solids and associated oil, or oil from streams containing both water and oil for example in the process described in our British Patent Specification No. 2038652A in which a mixture of oil, produced water and produced solids is passed through a filter to remove solids and then through a coalescer to separate the oil and water.

Thus, according to another aspect of the present invention there is provided a method for removing solids, if present, and associated oil, or oil from a stream containing water, oil, and optionally solids, which method comprises filtering the stream through a polyacrylonitrile filter element as hereinbefore described and removing solids, if present, and associated oil, or oil from the stream.

The stream to be filtered may be one containing a large proportion of oil in relation to the water, for example, an oil well stream and the method can therefore be suitable for employment in an oil field location. Alternatively, the content of water may be much larger in which case the method is suitable for a water clean up or water polishing treatment at a refinery.

The invention is illustrated by the following examples:

EXAMPLE 1

A needle punched felt element was prepared from polyacrylonitrile fibres sold under the Registered Trade Mark Orlon 80. The element had the following properties.
1. thickness: 11 mm
2. density: 0.20 gm/cc
3. diameter of fibres: 25 microns The element was formed into an annulus of the following dimensions:
4. inner diameter: 38 cm
5. length in an axial direction: 122 cm

EXAMPLE 2

The element was installed in a stainless steel holder and sea water was filtered through the element by passing radially outwards through the annulus. The sea water had been withdrawn from the North Sea at a depth of 60 meters and treated by:
  (a) injection of hypochlorite giving a chlorine content in the range of 0.1 to 0.4 ppm.
  (b) filtration through a stainless steel or polyester mesh to remove particles of size greater than 80 microns.
  (c) deoxygenation by conventional means employed for injection water.
  (d) addition of biocide as conventionally practiced.
The water thus treated contained:
0.7 to 1.5 mg/liter of particles of 0.4 to 80 microns as determined by the standard Nuclepore technique.

The water flowed through the filter element at the rate of 85 $m^3/m^2/hr$. The filtrate was examined and it was found that 65% of particles in the 2 to 2.5 microns range were removed and 72% of particles in the 4 to 5 microns range.

After 15 minutes filtration the element was cleaned by backwashing a segment of about 3°-4° of arc by supplying water at a pressure of 4.14 to 5.52 bar so that it flowed radially inward through the segment at the rate of 7 to 15 liters/linear cm/minute whilst maintaining the filtration in the opposite direction. The backwashing was continued for 1 minute. The outlet was in the form of a rotating arm which rotated at 2 rpm.

The filtered water was injected via an injection well into an oil reservoir to maintain pressure and drive the oil towards production wells.

At 60 hours there was no significant pressure build up (a steady pressure of 48 mbar).

EXAMPLE 3

By way of comparison, a similar element manufactured from polyester fibres was used to filter North Sea water treated in the same way.

In this case, 72% of particles in the 2 to 2.5 microns range and 72% of particles in the 4 to 5 microns range were removed.

After 60 hours, despite using the same backwash technique as in Example 2, the pressure had built up to 1020 mbar, increasing sharply with time. Normally elements are replaced at about 350 mbar.

A comparison of Examples 2 and 3 shows that the polyacrylonitrile filter element has the following advantages over the polyester element:
  1. The build up of pressure across the filter is slower. This is believed to be due to the fact that backwashing is more effective for the polyacrylonitrile element than for the polyester. The slower pressure build up is not due to significantly less material being filtered out.
  2. The period between backwashing can be extended.
  3. The life of the filter element before it must be replaced is extended.

We claim:
1. A backwashable filter element suitable for the filtration of sea water, consisting of a fabric of polyacrylonitrile fibres wherein the diameter of the fibres is in the range 10 to 50 microns and the density of the element is in the range 0.05 to 0.50 g/cc, the filter element having been made by a needle punch process.
2. A filter element according to claim 1 wherein the diameter of the fibres is in the range 20 to 35 microns.
3. A filter element according to either of the preceding claims wherein the density of the element is in the range 0.10 to 0.25 g/cc.
4. A filter element according to claims 1 or 2 wherein the thickness of the element is in the range 2 to 20 mm.
5. A filter element according to claims 1 or 2 wherein the element is in the form of an annulus.
6. A method for the treatment of sea water containing solid impurities which method comprises filtering the sea water through a filter element consisting of a fabric of polyacrylonitrile fibres wherein the diameter of the fibres is in the range 10 to 50 microns and the density of the element is in the range 0.05 to 0.50 g/cc and removing at least some of the solid impurities from the water, the filter element having been made by a needle punch process.

7. A method for the treatment of sea water according to claim 6 wherein the flow of water through the filter element is in the range 60 to 120 m$^3$/m$^2$/hr.

8. A method for the recovery of oil from a coastal or offshore reservoir which method comprises the steps of filtering sea water according to either of claims 6 or 7, injecting the filtered sea water into the reservoir through an injection well and recovering crude oil from the reservoir through a production well.

9. A method for removing solids, if present, and associated oil, or oil from a stream containing water, oil and optionally solids, which method comprises filtering the stream through a filter element consisting of a fabric of polyacrylonitrile fibres wherein the diameter of the fibres is in the range 10 to 50 microns and the density of the element is in the range 0.05 to 0.50 g/cc and removing solids, if present, and associated oil, or oil from the stream, the filter element having been made by a needle punch process.

* * * * *